Patented Oct. 6, 1953

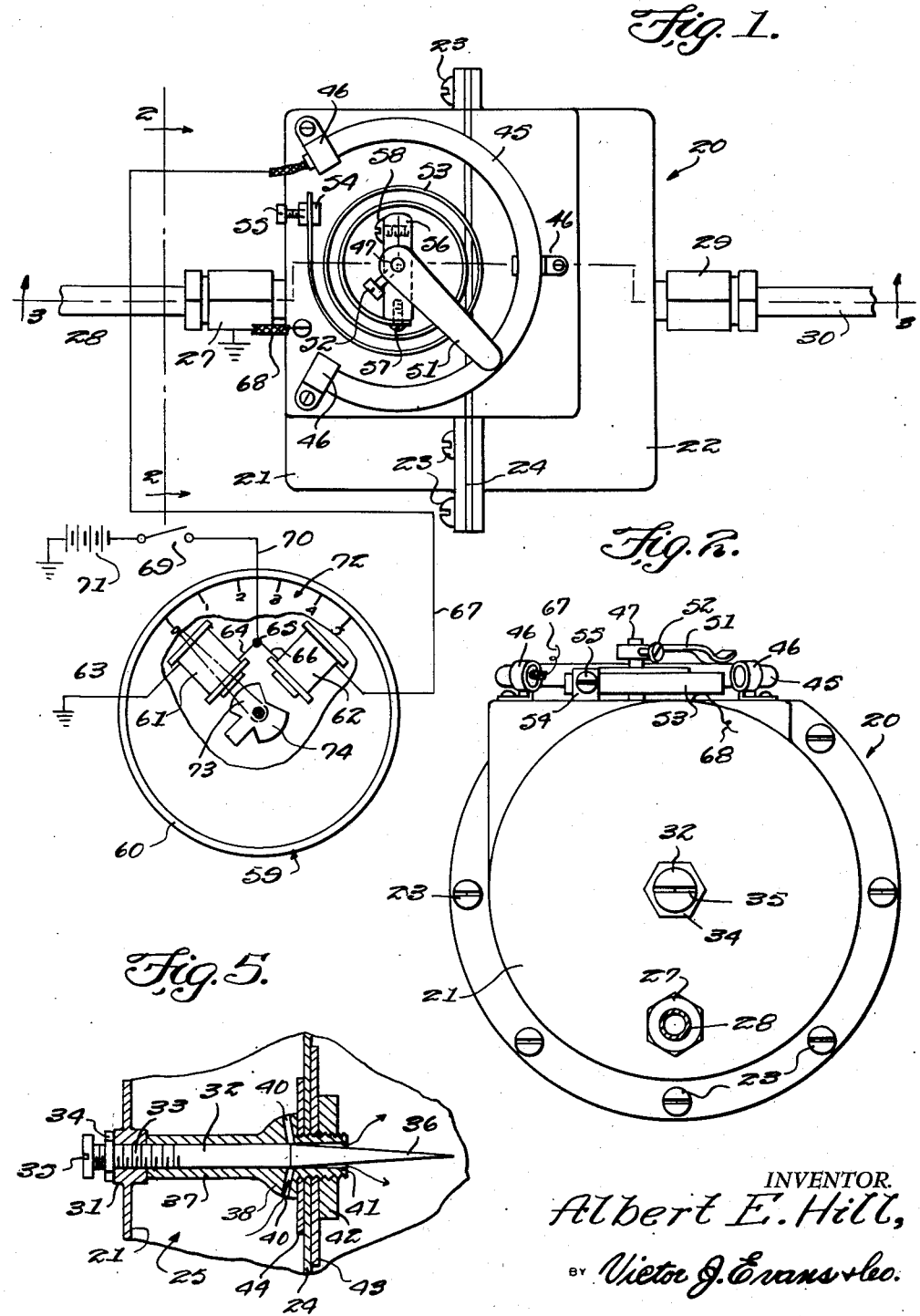

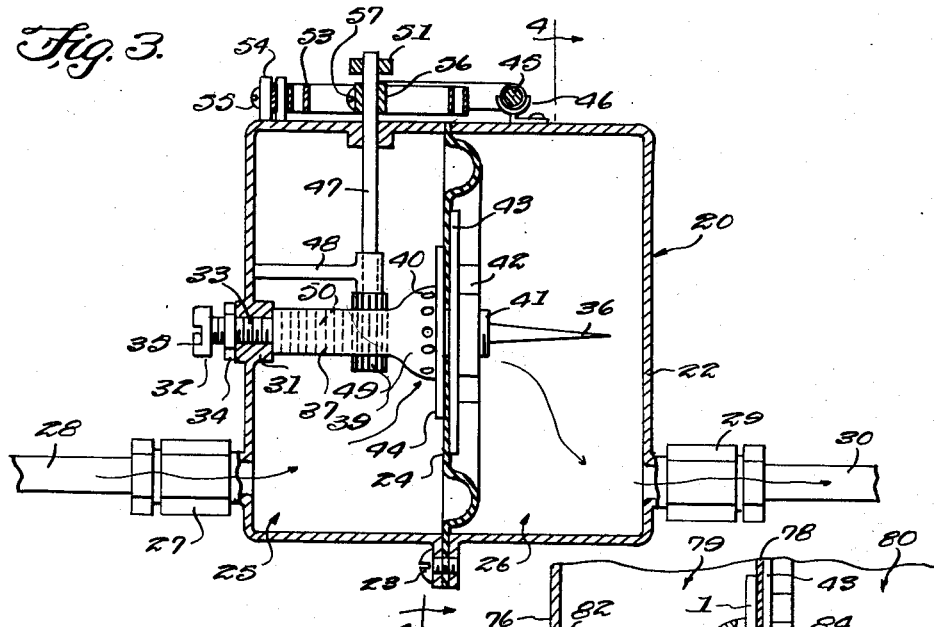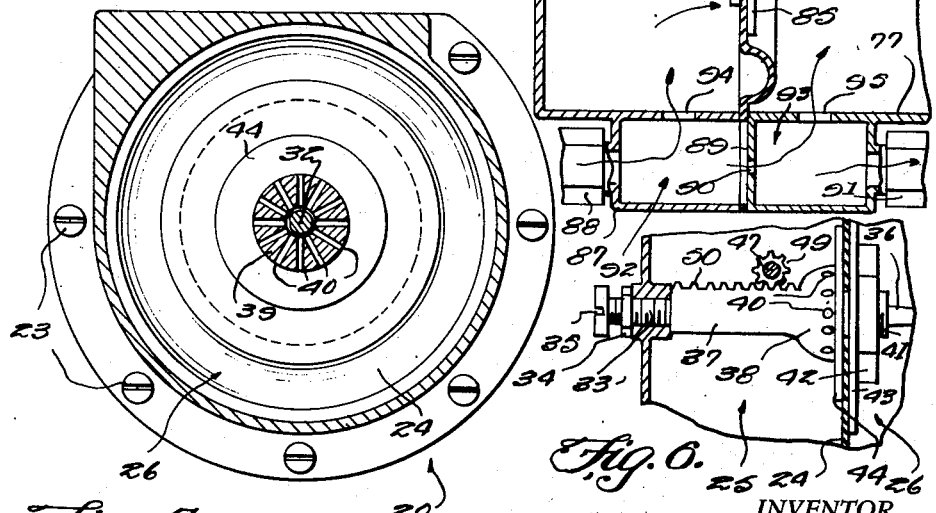

2,654,245

UNITED STATES PATENT OFFICE 2,654,245

GASOLINE FLOWMETER

Albert E. Hill, Tulsa, Okla.

Application October 10, 1950, Serial No. 189,449

4 Claims. (Cl. 73—210)

This invention relates to a flow meter, and more particularly to a flow meter for indicating gas or fuel consumption in a vehicle.

The object of the invention is to provide a flow meter which is adapted to be positioned in the fuel line between the fuel pump and carburetor of a vehicle, such as an automobile, whereby the meter will accurately indicate the amount of fuel being used in gallons per hour, or other units.

Another object of the invention is to provide a flow meter for measuring fuel rate, the flow meter being installed in the vehicle without necessitating any change in the vehicle electrical wiring system, the flow meter registering accurately even though a heavy load is put on the electrical system.

A further object of the invention is to provide a flow meter which is extremely simple and inexpensive to manufacture.

Other objects and advantages will be apparent during the course of the following description.

In the accompanying drawings forming a part of this application, and in which like numerals are used to designate like parts throughout the same:

Figure 1 is a top plan view of the flow meter of the present invention, as the flow meter would appear mounted in the fuel line between the gas pump and carburetor;

Figure 2 is a sectional view taken on the line 2—2 of Figure 1;

Figure 3 is a sectional view taken on the line 3—3 of Figure 1;

Figure 4 is a sectional view taken on the line 4—4 of Figure 3;

Figure 5 is a detail sectional view of the metering rod and the metering rod jet sleeve;

Figure 6 is a detail sectional view of the metering rod jet sleeve and rheostat wiper drive;

Figure 7 is a fragmentary sectional view showing a modified flow meter.

Referring in detail to Figures 1 through 6 of the drawings, the numeral 20 designates a hollow housing which may be fabricated of any suitable material, and the housing 20 includes a pair of sections 21 and 22 which are detachably connected together by suitable screws 23, Figure 3. Mounted between the meeting edges of the pair of sections 21 and 22 is a diaphragm 24, the diaphragm 24 being flexible and made of any suitable material, such as plastic or rubber. The diaphragm 24 defines within the housing 20 a first compartment 25 and a second compartment 26.

A bushing 27 connects the fuel line or pipe 28 to the first compartment 25, and the fuel line 28 is adapted to transfer or convey gasoline from the fuel pump or source of supply to the compartment 25. A second bushing 29 serves to connect the fuel line 30 to the other compartment 26, and the fuel line 30 serves to convey gasoline or fuel from the compartment 26 to the engine carburetor.

Extending through the compartment 25 is a rod 32, Figure 5. The rod 32 includes a threaded portion 33 which is arranged in threaded engagement with an interiorly threaded shoulder 31 that is formed integrally with the section 21. A nut 34 serves to maintain the rod 32 immobile in its various adjusted positions, and the outer end of the rod 32 is provided with a kerf or slit 35, so that a suitable tool such as a screw driver can be used for adjusting the position of the rod 32. The other end of the rod 32 is tapered or pointed, as at 36, and the pointed end 36 extends into the compartment 26 for a purpose to be later described.

Slidably mounted on the rod 32 is a jet sleeve 37, and the sleeve 37 is provided with an annular enlargement 38. Extending through the enlargement 38 is a plurality of radially extending bores or openings 40, and the openings 40 communicate with a longitudinally extending bore 39, the bore 39 extending longitudinally through the sleeve 37. By means of this construction, gasoline will be able to flow from the compartment 25, through the openings 40, thence through the bore 39, and into the second compartment 26, when the diaphragm 24 is properly positioned. One end of the sleeve 37 is shaped to define an exteriorly threaded collar 41, and a nut 42 is arranged in threaded engagement with the collar 41. A large washer 43 is circumposed on the collar 41, and the washer 43 is interposed between the nut 42 and the diaphragm 24. Interposed between the enlargement 38 and the diaphragm 24 is a second washer 44. By means of this construction, a fluid-tight seal is effected between the compartments and also between the diaphragm and sleeve. Thus, when sufficient gasoline is being drawn into the carburetor from the compartment 26, the diaphragm 24 will move sufficiently to thereby move the sleeve 37 along the rod 32, so that gasoline can flow from the compartment 25 through the openings 40, then out through the open end of the sleeve 37 into the compartment 26.

Mounted on the top of the housing 20 and supported by insulated brackets 46 is a curved rheostat 45, Figure 1. Extending through the first compartment 25 and rotatably supported by a boss 48 is a shaft 47, Figure 3. Mounted on the inner end of the shaft 47 is a gear 49, and the gear 49 meshes with gear teeth 50 that are arranged longitudinally along the exterior surface of the sleeve 37. Thus, when the sleeve 37 moves, as previously described, there will be a rotary movement of the shaft 47. A wiper arm 51 has one end connected to the upper end of the shaft 47 by a set screw 52, so that by loosening the set screw 52, the position of the wiper arm 51 on the shaft 47 can be adjusted. The wiper arm 51 frictionally engages the rheostat 45 so that the amount of current flowing through the electrical circuit will vary, depending upon the position of the wiper arm 51 with respect to the rheostat 45.

A spring member 53 has one end connected to an anchor element 54 by means of a set screw 55, Figure 1, and the anchor element 54 is connected to the top of the housing in any suitable manner. The other end of the spring member 53 is connected to a clamp 56 by means of a screw 57. A screw 58 serves to lock the clamp 56 onto the shaft 47, so that by loosening the screw 58, the position of the clamp 56 can be varied in order to adjust the tension on the spring member 53.

The apparatus of the present invention further includes a conventional indicating gauge which is indicated by the numeral 59, Figure 1. The gauge 59 may include a casing 60, and arranged in the casing 60 is a pair of coils 61 and 62. A suitable electric wire 63 serves to ground the coil 61, and a wire 64 serves to electrically connect the coil 61 to a contact 65, the contact 65 being connected to the coil 62 by a suitable wire 66. The coil 62 is also electrically connected to the rheostat 45 by means of a wire or cable 67, and a wire 68 serves to ground the housing 20. The numeral 69 designates a switch which may be the ignition switch of an automobile, there being a wire or cable 70 electrically connecting the switch 69 to the contact 65, and the switch 69 is electrically connected to the battery 71. Arranged in the casing 60 is an armature 74, and connected to the armature 74 is a pointer element 73, the pointer element 73 adapted to coact with an indicating scale or dial 72 that may be graduated in gallons per hour.

Referring to Figure 7, there is shown a slightly modified portion of a flow meter which includes a hollow housing 75, and the housing 75 includes a pair of sections 76 and 77. Mounted in the housing 75 is a diaphragm 78, and the diaphragm 78 defines a first compartment 79 and a second compartment 80. Extending through the compartment 79 is a rod 81, the rod 81 including a threaded portion 82 that is arranged in engagement with the section 76. The rod 81 projects into a sleeve 86 and terminates on the left side of diaphragm 78, Figure 7. The sleeve 86 is slidably arranged on the rod 81, and the sleeve 86 is threaded, as at 83, and is also provided with an annular washer 85 which is arranged contiguous to a nut 84, the nut 84 being arranged in engagement with the threaded end 83 of the sleeve 86. A washer 1 is arranged on the other side of the diaphragm 78.

Thus, when the diaphragm 78 is moved by pressure of fuel, there will be a consequent movement of the sleeve 86. When the sleeve 86 moves, there will be a movement of the previously-described wiper arm along th rheostat to thereby actuate the indicating gauge 59.

Mounted below the housing 75, or formed integrally therewith, is a casing 87, and a bushing 88 serves to connect a suitable pipe to the casing 87, so that fuel can be conveyed from the fuel pump into the casing 87. A second bushing 91 serves to connect a pipe or fuel line to the other end of the casing 87 so that fuel can be conveyed to the carburetor from the casing 87. Arranged within the casing 87 is a partition 89, the partition 89 provided with an aperture 90 for the egress therethrough of fuel. The partition 89 defines a first compartment 92 and a second compartment 93. The first compartment 92 communicates with compartment 79 by means of an opening or aperture 94, while the other compartment 93 communicates with the compartment 80 through the medium of an aperture or opening 95.

The flow meter of the present invention is actuated when the fuel flow changes and the flow meter will indicate continuously the gallons per hour that the auto is using at the instant the gauge is read. The spring member 53 is of the flat coiled type used in clock mainsprings, and the clamp 56 is slipped down over the shaft 47 before the wiper arm 51 is installed. Whenever the tension of the spring member 53 is to be changed, the screw 58 can be loosened and the clamp 56 rotated around the shaft 47 to the desired direction. It will be noted that with this arrangement the gear 49 will be held in tension against the gear rack 50 on the sleeve 37, thus eliminating any back lash between these parts. The wiper arm 51 is secured to the shaft 47 by the set screw 52, so that it can be adjusted. The flow meter of the present invention will accurately measure the amount of gasoline going through the carburetor when the engine is running, and this information will be transmitted to the gauge 59. Fuel from the pump enters compartment 25 through the pipe 28, and this fuel will fill up compartment 25 and exert a pressure on the diaphragm 24, the diaphragm 24 also acting as a gasket between the sections of the housing 20. The washer 43 transmits the power or pressure applied to the diaphragm 24 to the sleeve 37, the diaphragm 24 being attached to the sleeve 37 by the nut 42. In assembling the apparatus, a washer 44 is first threaded or slipped over the collar 41, next the diaphragm 24 is positioned over the collar 41, and then the washer 43 and retaining nut 42 are positioned on the collar 41. This will insure that a leak-proof seal is provided.

The spring member 53 is attached to the shaft in such a manner so as to apply pressure onto the sleeve 37 through the gear 49, so that the sleeve 37 is forced back against the end wall of the section 21. In Figure 1, the source of power may be the battery 71, and the wiring system is exactly the same as that used in indicating fuel quantity in fuel tanks and several types of automobiles now in general use. The gauge 59 is conventional and may be calibrated in gallons per hour. Current from the battery 71 travels to the ignition key 69 and when the ignition key or switch 69 is turned on, current will flow through wire 70 to the terminal or contact 65. From the terminal 65, the current travels through the two wires 64 and 66 to the coils 61 and 62. Coil 61 is a potential coil, and coil 62 is a series coil. These two coils attract or move the pointer element 73 which is attached to the armature 74. Thus, since these two coils are small electromagnets, the one which has the most current passing through it will exert the most force or attraction on the armature 74. The potential coil 61 will have a certain percentage of available current from the battery 71 passing through it and to the ground at all times. The attraction or pull exerted by the coil 61 on the armature 74 will remain constant in relation to the attraction of the series coil 62. The force that causes the pointer element 73 to move is the attraction of the series coil 62, since its force overcomes the force of the potential coil 61. Thus, as current flow varies through the series coil 62, the pointer element 73 will move accordingly. When a greater amount of current flows through the series coil 62, the pointer element 73 will move indicating a greater fuel flow on the gauge.

The rod 32 can be adjusted by loosening the lock nut 34 and then screwing the rod 32 in or out to give the correct or desired fuel flow indication on the rheostat 45. In order to offset or balance off the pressure against the diaphragm 24 in the compartment 25, the head spring member 53 is provided. Since there will be a slight pressure drop when the fuel from the compartment 25 flows into the compartment 26 past the tapered end 36, this loss of pressure can be controlled and is controlled by the spring member 53. Thus, by means of the spring member 53, a fairly constant head or differential pressure between the compartment 25 and the compartment 26 is assured. The tension of the spring member 53 can be adjusted by the adjusting screw 58. To transmit the movement of the diaphragm 24 to the rheostat 45, the gear rack 50 is provided on the sleeve 37, and the gear rack 50 meshes with the gear 49 on the shaft 47, the shaft 47 driving the wiper arm 51 over the rheostat resistances 45. Suitable numbers may be arranged around the rheostat 45 to indicate the proper positions of the parts when the instrument is being calibrated. The operation of the apparatus is as follows: Fuel enters compartment 25 through the pipe 28 and fills the compartment 25. This forces the diaphragm 24 to the right, Figure 3, so as to overcome the pressure of the spring member 53. The position of the diaphragm 24, as shown in Figure 3, is such as to indicate that the fuel flow has stopped. As the diaphragm 24 with the sleeve 37 moves to the right, the end or collar 41 moves out over the tapered end 36 of the rod 32, thus creating an opening for fuel to flow from the compartment 25 into the compartment 26. Therefore, the further the diaphragm 24 and sleeve 37 move to the right, the greater the opening between the collar and the tapered end 36, so that consequently, the more fuel will flow into the compartment 26 and into the carburetor. The small holes 40 in the sleeve 37 permit passage of fuel from the compartment 25 through the sleeve 37 into the compartment 26. The area between the collar 41 and the tapered end 36 will vary depending upon the position of the diaphragm 24, and the greater the fuel flow, the further the diaphragm 24 will be forced to the right. Thus, as the diaphragm 24 is forced to the right, the wiper arm 51 of the rheostat assembly is moved over the resistance or rheostat 45. Therefore, the smaller amount of resistance will be set up in the rheostat when the fuel flow increases, and conversely when there is a smaller fuel flow, there will be more resistance set up in the rheostat 45. After the fuel enters the compartment 26, it will pass out through the pipe 30 and into the engine carburetor.

This movement of the diaphragm 24 is brought about as the result of stepping on the accelerator. Thus, as the accelerator is depressed, more fuel will be drawn from the compartment 26, so that the pressure will drop in compartment 26. When the pressure decreases in compartment 26, the pressure of the fuel in compartment 25 will force the diaphragm 24 over toward the compartment 26, thus increasing the size of the opening between the collar 41 and the tapered or pointed end 36, to thereby permit more fuel to enter the compartment 26. When the pressure in compartment 26, together with the tension of the spring member 53, equals the pressure in the compartment 25, the diaphragm 24 and sleeve 37 will assume a stationary position and this new position will be transmitted to the wiper arm 51. Thus, the free opening or space between the sleeve 37 and tapered end 36 will be measured.

In the flow meter shown in Figure 7, the fuel enters through the bushing 88 into the compartment 92 and fills the compartment 79. At the same time, additional fuel passes through the orifice 90 in the partition or plate 89 and fills the compartment 80. The compartments 79 and 80 are separated completely by the diaphragm 78, so that fuel never passes directly from the compartment 79 to the compartment 80 or vice versa. As the fuel passes through the orifice 90, there will be a predetermined presure drop depending upon the rate of flow and size of orifice 90 in the partition 89. This pressure drop will create a differential pressure between the compartment 79 and the compartment 80 and will force the diaphragm 78 toward the compartment 80 until the pressures between the two compartments is stabilized. As the diaphragm 78 moves over it will transmit its new position to the rheostat in the same manner as the previously-described movement is accomplished. The rheostat and gauge for the assembly shown in Figure 7 is identical with the rheostat and gauge shown in Figures 1 through 6. Therefore, the greater the fuel flow, the greater the differential pressure between compartments 79 and 80, and this causes the diaphragm 78 to seek a new position.

Referring to Figure 1, the path of the electric current can be traced as it passes through the various parts of the apparatus. Thus, current passes through the series coil 62, then through the wire 67 and into the rheostat 45. The current must now pass through the rheostat 45 in order to reach the wiper arm or brush 51, so that it can continue on to ground through wire 68. Since electricity takes the path of least resistance, the more resistance set up in the rheostat by the position of the wiper arm 51, the less current will flow through the series coil 62, and consequently, this coil will exert less attraction on the armature 74. This condition will occur when there is a low fuel flow. As the fuel flow increases, the wiper arm 51 will be forced to move over the rheostat 45 in a counterclockwise direction, Figure 1. This action will cause a decrease in the resistance to the flow of current through the coil 62 and therefore, more current will flow through the series coil 61, so that the coil 61 will have an increased attraction for the armature 74 to thereby cause the pointer element to indicate a corresponding increase in fuel flow on the indicating gauge 59. As fuel starts flowing, the wiper arm 51 is forced around the resistance in the rheostat in a clockwise direction, and as the wiper arm 51 moves over the rheostat, the pointer element 73 will move correspondingly to indicate gallons per hour or any fraction thereof.

Furthermore, the condition and load on the electrical system will not affect the operation of the apparatus. Thus, a sudden heavy load on the electrical system, such as turning on bright lights, radio, heater and the like, will not cause the pointer element to drop or fluctuate even if the generator is not putting out. The armature 74 is constructed so that it will return to zero, since it is weighted on one side. Also, the flow meter can be constructed so that it has a square shape if desired.

I claim:

1. In a flow meter, a housing, apertured diaphragm arranged in said housing and defining a first and second compartment, a pipe connected to said first compartment for conveying fuel thereto, a pipe communicating with said second compartment for conveying fuel therefrom, an electrically actuated gauge for indicating the rate of flow of fuel through said pipes, and means responsive to movement of said diaphragm for actuating said gauge, said means comprising a hollow sleeve connected to said diaphragm, a rod extending through said sleeve and having a tapered end projecting through said first compartment, said sleeve and said diaphragm, there being a plurality of spaced openings arranged in said sleeve, a rheostat arranged exteriorly of said housing, a shaft rotatably projecting through said first compartment, a wiper arm mounted on the outer end of said shaft for engaging said rheostat, and gear means connecting the inner end of said shaft to said sleeve, an end of said rod being fixed to the housing whereby relative movement between the tapered end of the rod and the diaphragm permits flow from the first to the second compartment.

2. The apparatus as described in claim 1, wherein said last-named means comprises a gear on said shaft meshing with teeth on the sleeve.

3. In combination, a hollow housing including a pair of sections connected together, an apertured diaphragm mounted between said sections and defining a first and second compartment, a pipe for conveying fuel from a source of supply to said first compartment, a pipe for conveying fuel away from said second compartment, a rod extending through said first compartment and through said diaphragm, said rod having a pointed end extending into said second compartment, a sleeve connected to said diaphragm and slidably arranged on said rod and provided with a plurality of radially extending bores communicating with said first compartment, a shaft rotatably supported by said housing, gear means connecting the inner end of said shaft to said sleeve, a rheostat mounted on the top of said housing, a wiper arm carried by the outer end of said shaft for engagement with said rheostat, a spring member operatively connected to said shaft, and an indicator gauge electrically connected to a source of electrical energy and to said rheostat, an end of said rod being fixed to the housing whereby relative movement between the tapered end of the rod and the diaphragm permits flow from the first to the second compartment.

4. The apparatus as described in claim 3, wherein said indicating gauge is graduated so as to indicate rate of flow of fuel through said pipes upon movement of said diaphragm.

ALBERT E. HILL.

References Cited in the file of this patent

UNITED STATES PATENTS

| Number | Name | Date |
|---|---|---|
| 1,416,220 | Long et al. | May 16, 1922 |
| 1,921,550 | Swallen | Aug. 8, 1933 |
| 2,178,422 | Heagney | Oct. 31, 1939 |
| 2,273,331 | Rowerdink | Feb. 17, 1942 |
| 2,329,142 | Shank | Sept. 7, 1943 |